(12) United States Patent
Ito

(10) Patent No.: US 6,948,182 B2
(45) Date of Patent: Sep. 20, 2005

(54) OPTICAL DISC

(76) Inventor: Tomoaki Ito, 4-2-3-104, Shiginonishi, Joto-ku, Osaka-shi, Osaka (JP), 536-0014

(*) Notice: Subject to any disclaimer, the term of this patent is extended or adjusted under 35 U.S.C. 154(b) by 28 days.

(21) Appl. No.: 10/239,646
(22) PCT Filed: Mar. 22, 2001
(86) PCT No.: PCT/JP01/02306
§ 371 (c)(1), (2), (4) Date: Jan. 10, 2003
(87) PCT Pub. No.: WO01/71716
PCT Pub. Date: Sep. 27, 2001

(65) Prior Publication Data
US 2003/0152017 A1 Aug. 14, 2003

(30) Foreign Application Priority Data
Mar. 24, 2000 (JP) .......................... 2000-084851
Sep. 22, 2000 (JP) .......................... 2000-288602

(51) Int. Cl.$^7$ ............................................. G11B 7/0033
(52) U.S. Cl. ..................................................... 720/745
(58) Field of Search ........................ 720/745; 369/273, 369/280

(56) References Cited

U.S. PATENT DOCUMENTS 6,016,298 A * 1/2000 Fischer ....................... 720/745
6,304,544 B1 * 10/2001 Pierson et al. .............. 369/273
6,400,675 B1 * 6/2002 Everidge et al. ............ 369/273
6,510,124 B1 * 1/2003 Wood .......................... 369/273

FOREIGN PATENT DOCUMENTS

| JP | 10-269620 | 10/1998 |
| JP | 3064414 | 1/2000 |
| JP | 2001-56966 | 2/2001 |

* cited by examiner

Primary Examiner—Tianjie Chen
(74) Attorney, Agent, or Firm—Watchstone P + D; Stephen B. Parker

(57) ABSTRACT

The present invention provides a nonstandard-sized optical disc capable of decreasing thickness even when a plurality of optical discs are piled up and assuredly positioning in a disc main body fitting dented portion of a disc player. This optical disc includes a disc main body and an outwardly protruded plate portion protruded outwardly from the disc main body. The outwardly protruded plate portion is formed to have a thickness thinner than that of the disc main body, and the lower portion of the disc main body is formed to have a size to be fitted in the disc main body fitting dented portion in a tray of a disc player. An outer peripheral edge of the lower portion of the disc main body has at least two positioning points to be disposed in the proximity of an inner peripheral edge of the disc main body fitting dented portion to thereby position the disc main body in the disc main body fitting dented portion when the lower portion of the disc main body is fitted in the disc main body fitting dented portion.

19 Claims, 7 Drawing Sheets

FIG. 11
CONVENTIONAL
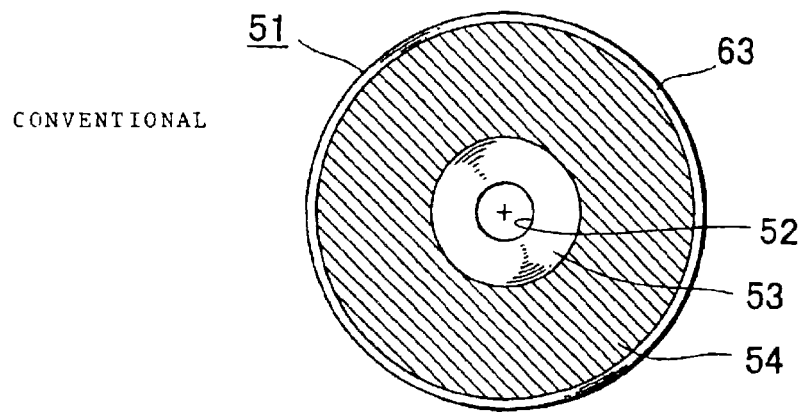
FIG. 12
CONVENTIONAL
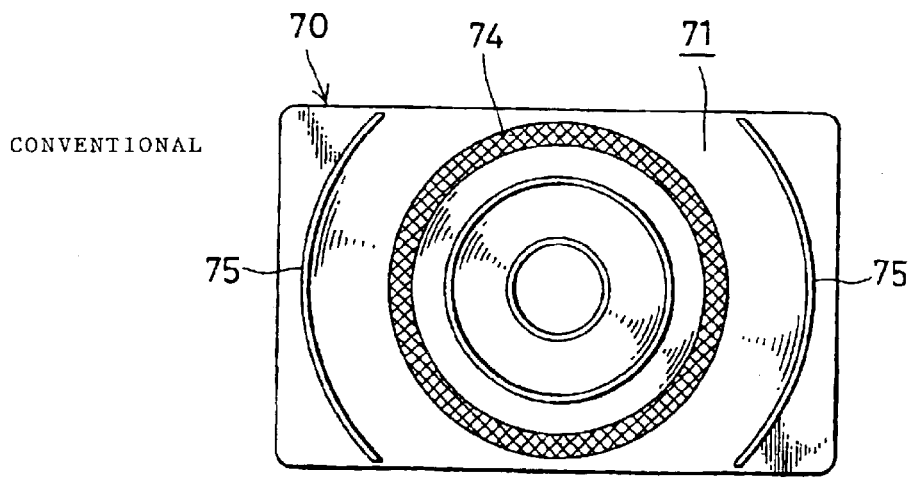
FIG. 13
CONVENTIONAL
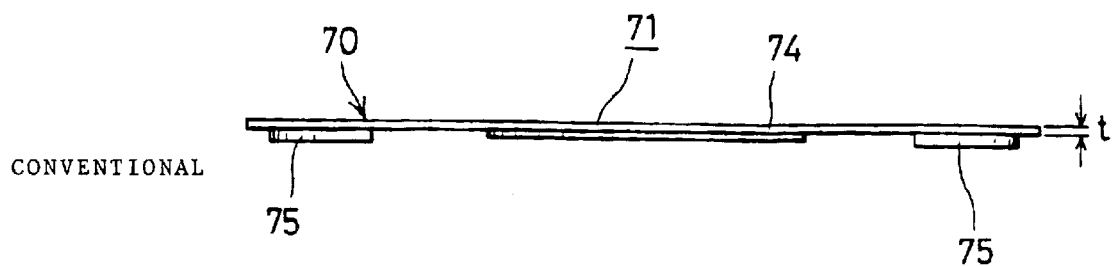

FIG. 14
CONVENTIONAL
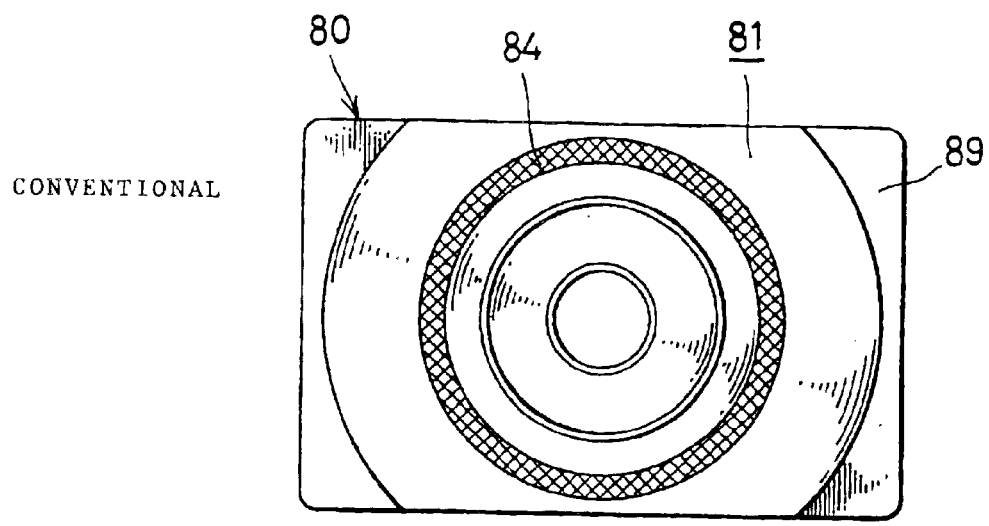
FIG. 15
CONVENTIONAL
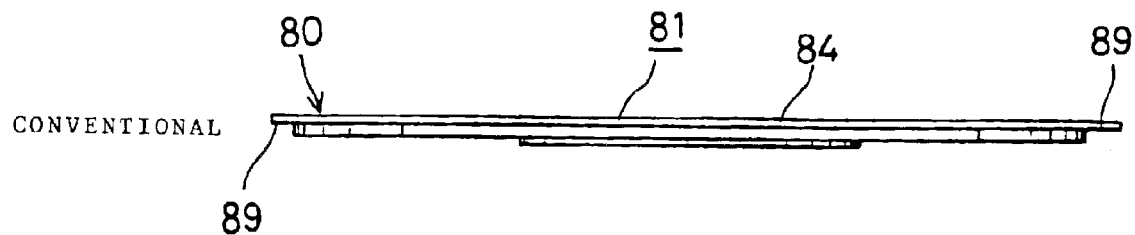

OPTICAL DISC

TECHNICAL FIELD

The present invention relates to an optical disc, such as a CD and a DVD, particularly to an optical disc having a non-true circular peripheral configuration.

BACKGROUND ART

As shown in FIG. 11, an optical disc 51, which became an indispensable information medium recently, has a ring-shaped clamping area 53, which stores no information, formed outside a central aperture 52, a ring-shaped information recording area 54 formed outside the clamping area and a transparent area 63 with a small width, which stores no information, formed at an outer disc periphery at the outside of the information recording area. Such standard-sized optical disc is formed into a true-circular shape with a diameter of 12 cm (weight: 15 to 16 g) or a diameter of 8 cm (weight: 7 to 8 g).

Other than the standard-sized optical disc 51, a card-shaped optical disc 70 or 80 having the same size as that of a card such as a credit card has been proposed recently by, for example, Japanese registered utility model No. 3,064,414.

One of the proposed optical discs 70 is shown in FIGS. 12 and 13. The entire disc including a disc main body 71 is formed into a card-shape having the same size as that of various cards such as a credit card. The thickness "t" is set to 1.2 mm that is a standard thickness of an optical disc. The disc main body 71 is provided with a pair of arc-shaped protrusions 75 and 75 at the lower side and outside the information recording area 74 of the disc main body. The arc-shaped protrusions 75 and 75 can fit in the 8 cm-diameter disc main body fitting dented portion 92 formed in the tray 91 of the disc player 90 as shown in FIG. 16 and the radius of curvature is set to about 4 cm.

Furthermore, an optical disc 80 according to another proposal is shown in FIGS. 14 and 15. In this disc, the thickness of the disc main body 81 including the information recording area 84 is increased while keeping the thickness of the external plate 89 formed outside the disc main body 81 the standard thickness, and the external periphery of the disc main body 81 is formed into an arc-shape having a radius of curvature of 4 cm.

Both of the aforementioned optical discs 70 and 80 have such advantages that it is possible to carry them in a wallet because they are card-shaped discs having the same size as those of various cards such as credit cards and that they can use as business cards depending on the contents of information recorded therein or printed information formed on the label side.

Although these optical discs 70 and 80 have aforementioned advantages, they also have the following disadvantages. That is, the disc becomes bulky due to the thickness of the arc-shaped protrusion 75 and the increased thickness of the disc main body 81, and therefore if a plurality of these optical discs are pilled up and stored in a wallet or the like, the total thickness increases although each increased thickness is small.

Furthermore, if the increased thickness is reduced in order to lessen the aforementioned disadvantage as much as possible, the stability of the optical disc in the disc main body fitting dented portion 92 deteriorates, which may cause inaccurate positioning of the disc in the disc player 90.

In order to improve the stability of the optical disc in the disc main body fitting dented portion 92, it is preferable to further increase the increased thickness. However, in a slot-in type disc player, if the entire thickness of the optical disc exceeds 1.5 mm, even if an adapter designed for card-shaped discs is employed, loading becomes impossible. Accordingly, in order to cope with the slot-in type player, the upper limit of the increased thickness is 0.3 mm.

However, in cases where the increased thickness is only 0.3 mm, the optical disc may not be installed in a tray type disc player 90. In other words, in cases where the disc player 90 is disposed horizontally, since the disc placing side of the tray 91 becomes horizontal, there is no problem. To the contrary, in cases where the disc player 90 is disposed vertically, since the disc placing side of the tray 91 will be also vertical, only the 0.3 mm increased thickness portion of the optical disc can be engaged with the disc main body fitting dented portion 92 of the vertically disposed tray. Accordingly, the optical disc 70 may drop out of the tray 91 at the time of the retraction movement of the tray into the disc player 90.

Furthermore, even in cases where the disc player 90 is disposed horizontally, if the moving speed of the tray 91 becomes faster, the optical disc may drop out of the disc main body fitting dented portion 92.

Furthermore, since the arc-shaped protrusion 75 or the thickness increased portion has to form on the disc main body 71 or 81, it is impossible to manufacture such optical discs 70 and 80 by cutting a 12 cm-standard-sized optical disc substrate into a desired shaped and grinding it.

The present invention was made to solve the aforementioned objects, and aims to provide a nonstandard-sized optical disc capable of reducing the thickness as much as possible even when a plurality of the optical discs are piled up and easily being fit in a disc main body fitting dented portion of a disc player.

DISCLOSURE OF INVENTION

An optical disc according to the present invention, comprises:

a disc main body including a clamping area and an information recording area outside the clamping area; and an outwardly protruded plate portion which outwardly protrudes outside the disc main body with an upper surface of the plate portion flush with an upper surface of the disc main body, wherein the outwardly protruded plate portion has a thickness smaller than that of the disc main body, wherein a lower portion of the disc main body is formed to have a size capable of being fitted in a disc main body fitting dented portion formed on a tray of a disc player, and wherein an outer peripheral edge of the lower portion of the disc main body has at least two positioning points to be disposed in the proximity of an inner peripheral edge of the disc main body fitting dented portion to thereby position the disc main body in the disc main body fitting dented portion when the lower portion of the disc main body is fitted in the disc main body fitting dented portion.

According to this optical disc, the lower portion of a disc main body can be fitted in a disc main body fitting dented portion of a tray of a disc player, and the relative positional relation with an optical pick-up apparatus of the disc player can be positioned correctly. Furthermore, any desired contour configuration of the outwardly protruded plate portion can be formed, which enables to obtain a unique optical disc.

The positioning points may be located at two intersections of a straight line passing through a center of the disc main body fitting dented portion and the outer peripheral edge of the lower portion of the disc main body or vicinities thereof. Further, the positioning points may be three points or more to be disposed in the vicinity of the inner peripheral edge of the disc main body fitting dented portion. In the latter case, the three points or more should be positioned so that a total of center side interior angles of triangles formed by segments connecting a center of the disc main body fitting dented portion and two adjacent positioning points become 360 degrees.

In cases where the optical disc is an 8 cm-diameter standard-sized optical disc, it is preferable that the disc main body is formed to have a thickness of 1.2 mm, and the lower portion of the disc main body is formed to have a size to be fitted in the 8 cm-diameter standard-sized main body fitting dented portion. This enables the optical disc to be assuredly fitted in the 8 cm-diameter standard-sized main body fitting dented portion.

For the purpose of enhancing the uniqueness, the contour configuration of an entire optical disc including the outwardly protruded plate portion may be formed into a non-circular shape, especially an approximate rectangle shape of 80 to 90 mm long and 50 to 60 mm wide to obtain a card-shaped CD.

The thickness of the disc main body to be fitted in the disc main body fitting dented portion of a disc main body increases as the thickness of the outwardly protruded plate portion decreases, and therefore the fitting ability will be enhanced. However, the outwardly protruded plate portion becomes fragile. Accordingly, it is preferable that the thickness of the outwardly protruded plate portion is 0.4 to 1.0 mm.

Preferably, the lower portion of the disc main body has a first weight increasing protrusion protruding downwardly at a lower surface thereof, and the first weight increasing protrusion has an outer peripheral edge which coincides with the outer peripheral edge of the lower portion of the disc main body. Since the thickness to be caught by the inner periphery of the disc main body fitting dented portion of the tray increases by providing such weight increasing protrusion, it is advantageous especially in cases where a disc player is disposed vertically.

It is more preferable that the lower portion of the disc main body has a second weight increasing protrusion protruding downwardly at a lower surface thereof between a central aperture of the optical disc main body and the information recording area. By providing the second weight increasing protrusion near the rotation center, the rotation balance is improved as compared to an optical disc having a weight increasing protrusion located far from the rotation center, and therefore surface swings and/or vibrations can be decreased.

It is preferable that the thickness of each of the aforementioned weight increasing protrusions is 0.3 mm or less. In cases where the thickness of the disc main body is 1.2 mm, if the thickness of the weight increasing protrusion exceeds 0.3 mm, the entire thickness of the optical disc exceeds 1.5 mm. As a result, the optical disc cannot be inserted in a slot-in type disc player/changer even if an adapter is used.

BRIEF DESCRIPTION OF DRAWINGS

FIG. 11 is an enlarged bottom view showing a conventional standard-sized optical disc.

FIG. 12 is a bottom view showing a conventional credit card-shaped optical disc having a pair of arch-shaped protrusions.

FIG. 13 is an enlarged side view showing the optical disc shown in FIG. 12.

FIG. 14 is a bottom view showing a conventional credit card-shaped optical disc increased in thickness.

FIG. 15 is an enlarged side view showing the optical disc shown in FIG. 14.

BEST MODE FOR CARRYING OUT THE INVENTION

The present invention will be described based on embodiments shown in the attached drawings.

Figure 1:
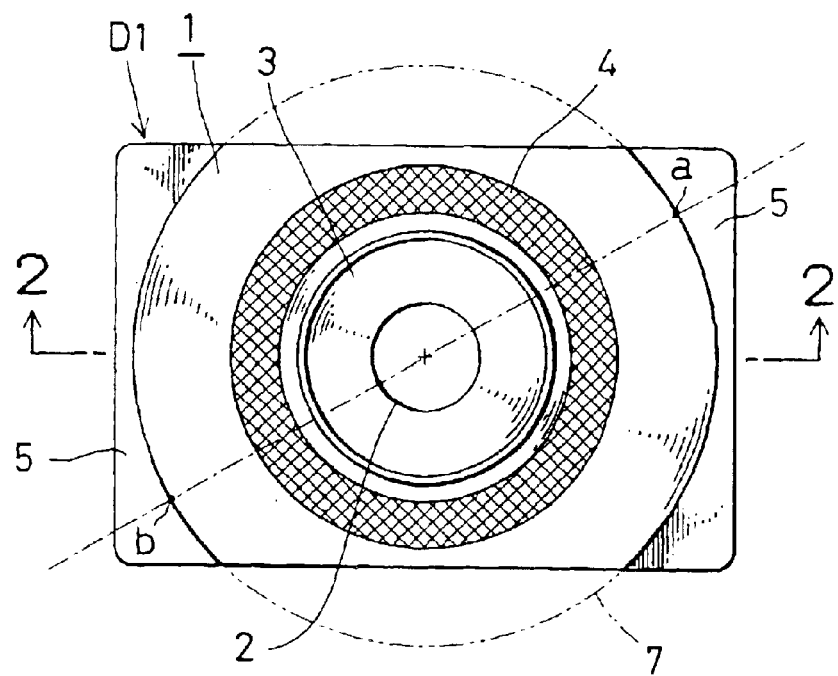
FIG. 1 is a bottom view showing the first embodiment of the optical disc according to the present invention.
Figure 2:
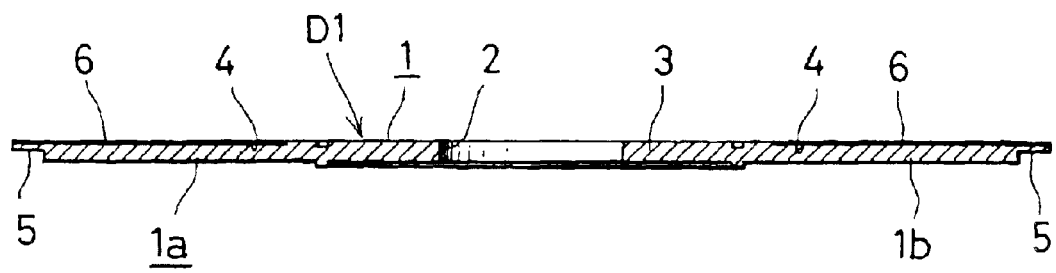
FIG. 2 is an enlarged cross-sectional view showing the reversed optical disc taken along the line 2—2 in FIG. 1.
Figure 3:
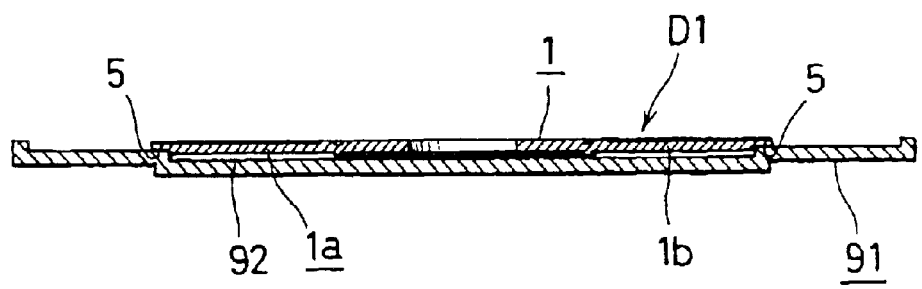
FIG. 3 is a cross-sectional view showing the state where the optical disc shown in FIG. 1 is placed in the disc main body fitting dented portion of the tray of the disc player.

FIG. 1 is a bottom view showing a disc substrate 1a side of an optical disc D1 according to the first embodiment of the present invention.

This optical disc D1 has a disc main body 1 with a lower portion having a size to be fitted in an 8 cm-standard-sized disc main body fitting dented portion 92 of a tray 91 of a disc player and an outwardly protruded plate portion 5 as an ornament plate extending outside the disc main body 1.

The disc main body 1, in the same manner as in a normal optical disc, is provided with an information recording area 4 on a transparent synthetic resin substrate 1a and outside a clamping area 3 located at the periphery of a central aperture 2, and a reflective layer 6 consisting of a thin film made of metal such as aluminum formed on the upper surface of the substrate 1a including the upper surface of the information recording area 4. The disc main body is formed to have a thickness of 1.2 mm.

The lower portion 1b of the disc main body 1 is formed to have a size to be fitted in the disc main body fitting dented portion 92 of the tray 91 of the disc player 90. Each of the longitudinal opposite outer edges of the lower portion 1b is formed into an arc-shape coincide with the perimeter 7 of the hypothetical true circle of 8 cm diameter. Accordingly, the outer peripheral edge of the disc main body 1 can be closely disposed at the inner periphery of the disc main body fitting dented portion 92. Thus, this outer peripheral edge has at least two positioning points "a" and "b" which are located at the ends of the diameter of the 8 cm-diameter hypothetical true circle and can position the disc main body 1 in the disc main body fitting dented portion 92.

At the outside of the disc main body 1, an outwardly protruded plate portion 5 outwardly protruding within the same horizontal plane as the upper surface of the disc main body, which will not be fitted in the disc main body fitting dented portion 92, is provided. The entire contour configuration of the optical disc including the outwardly protruded plate portion 5 is formed to have a card size 85 mm long and 58 mm wide.

The thickness of the outwardly protruded plate portion 5 is set to 0.9 mm. Accordingly, the lower portion 1*b* of the disc main body to be fitted in the disc main body fitting dented portion 92 has a thickness of 0.3 mm, and therefore can be stably fitted in the disc main body fitting dented portion 92.

This optical disc according to this embodiment D1 can be manufactured by, for example, cutting a 12 cm-standard-sized optical disc of 1.2 mm thickness into a rectangular card shape of 85 mm long and 58 mm wide, and then grinding roundly the longitudinal ends of the lower surface of the disc substrate 1*a* so as to form the lower end 1*b* of the disc main body capable of being fitted in the 8 cm-disc main body fitting dented portion 92. Thus, the lower portion 1*b* of the disc main body is formed into a configuration having the aforementioned arc-shaped outer periphery. Of course, it is possible to manufacture the optical disc by using a metal mold corresponding to the optical disc D1 of this embodiment.

Figure 4:
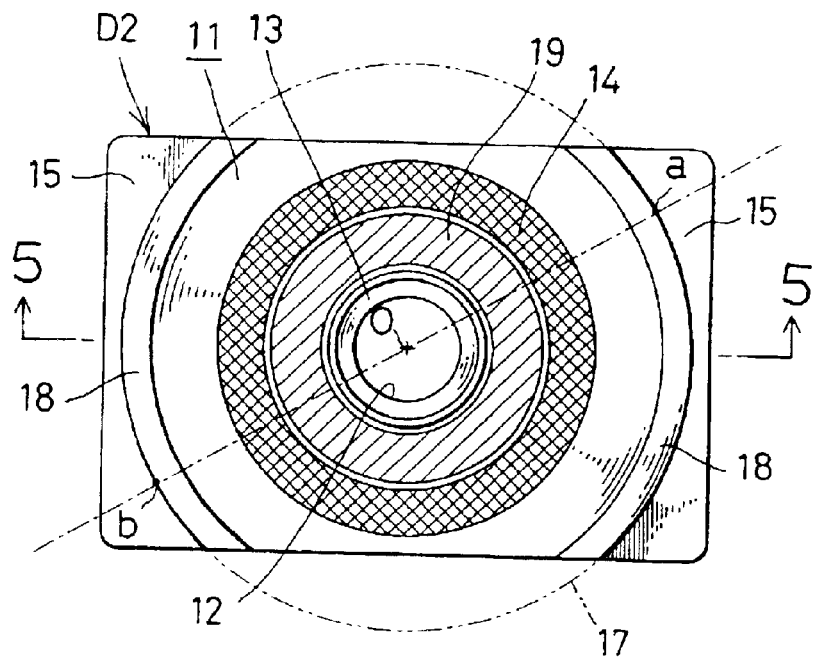
FIG. 4 is a bottom view showing the second embodiment of the optical disc according to the present invention.

FIG. 4 is a bottom view showing the disc substrate 11*a* side of an optical disc D2 of a second embodiment, which is the most preferable embodiment of the present invention.

This optical disc D2 has a 1.2 mm thick optical disc main body 11 having a lower portion 11*b* with a size capable of being fitted in the disc main body fitting dented portion 92 and a 0.9 mm thick outwardly protruded plate portion as an ornament plate. The structure is the same as that of the optical disk D1 of the aforementioned embodiment.

The optical disc D2 of this embodiment is different from the optical disc D1 of the previous embodiment in that a pair of downwardly protruded arc-shaped first weight increasing protrusion 18 located at the outside of the disc main body 11 and a downwardly protruded second weight increasing protrusion 19 located at the center side are provided on the lower surface of the disc main body 11. The pair of outer first weight increasing protrusion 18 and 18 are, as shown in FIG. 4, formed to have an outer peripheral edge with an arc-shape corresponding to the lower outer peripheral edge of the disc main body 11, and are formed to have a thickness of only 0.2 mm, respectively.

On the other hand, the second weight increasing protrusion 19 located at the center side is formed on the lower surface of the optical disc main body between the central aperture 12 and the information recording area 14. The second weight increasing protrusion 19 is formed into a ring-shape having a thickness of 0.2 mm which is the same as that of the first weight increasing protrusion 18.

Accordingly, in the optical disc D2 of this embodiment, the lower portion 11*b* of the disc main body about 0.5 mm thick can be fitted in the disc main body fitting dented portion 92 of the tray 91. Therefore, the optical disc D2 can be stably placed within the dented portion 92, and would hardly drop out of the disc main body fitting dented portion 92 even at the time of the retraction movement of the tray 91 of the disc player 90.

Furthermore, since the second weight increasing protrusion 19 is provided at the center side, the balance at the time of rotation can be improved and surface swings and/or vibrations can be decreased as compared to the case where only the first weight increasing protrusions 18 are provided.

Furthermore, in an optical disc with the lower portion 11*b* about 0.5 mm thick, the optical disc can be disposed in the disc main body fitting dented portion of the tray 91 more stably as compared to the optical disc of the previous embodiment, and would hardly drip out of the disc main body fitting dented portion 90. Accordingly, an optical disc in which the second weigh increasing protrusion 19 is omitted in this embodiment may be employed.

Figure 5:
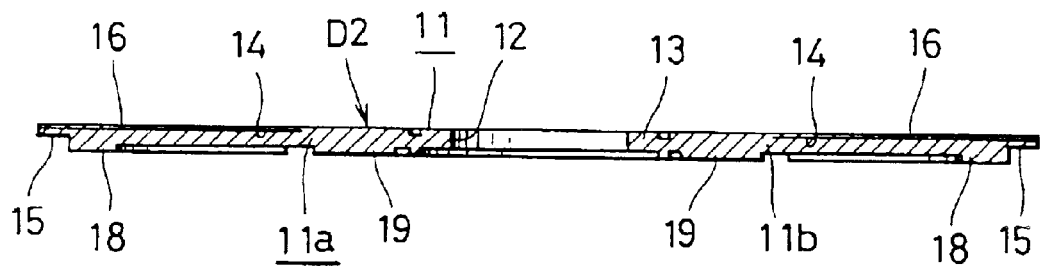
FIG. 5 is an enlarged cross-sectional view showing the reversed optical disc shown in FIG. 4 taken along the line 5—5 in FIG. 4.
Figure 6:
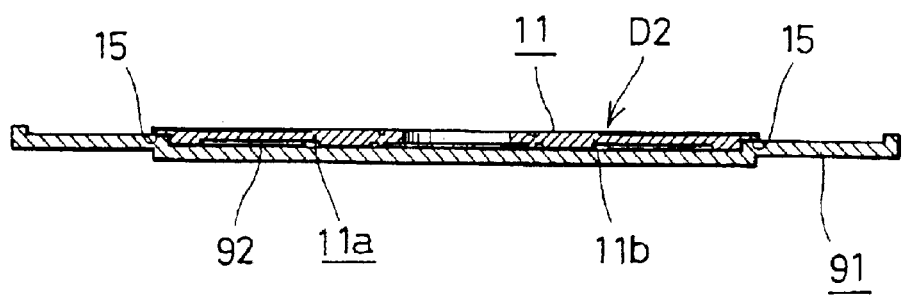
FIG. 6 is a cross-sectional view showing the state where the optical disc shown in FIG. 4 is disposed in the disc main body fitting dented portion of the tray of the disc player.

In FIGS. 4 to 6, the reference numeral "11*a*" denotes a disc substrate, "12" denotes a central aperture, "13" denotes a clamping area, "14" denotes an information recording area, and "17" denotes an 8 cm-diameter hypothetical true circle perimeter.

Figure 7:
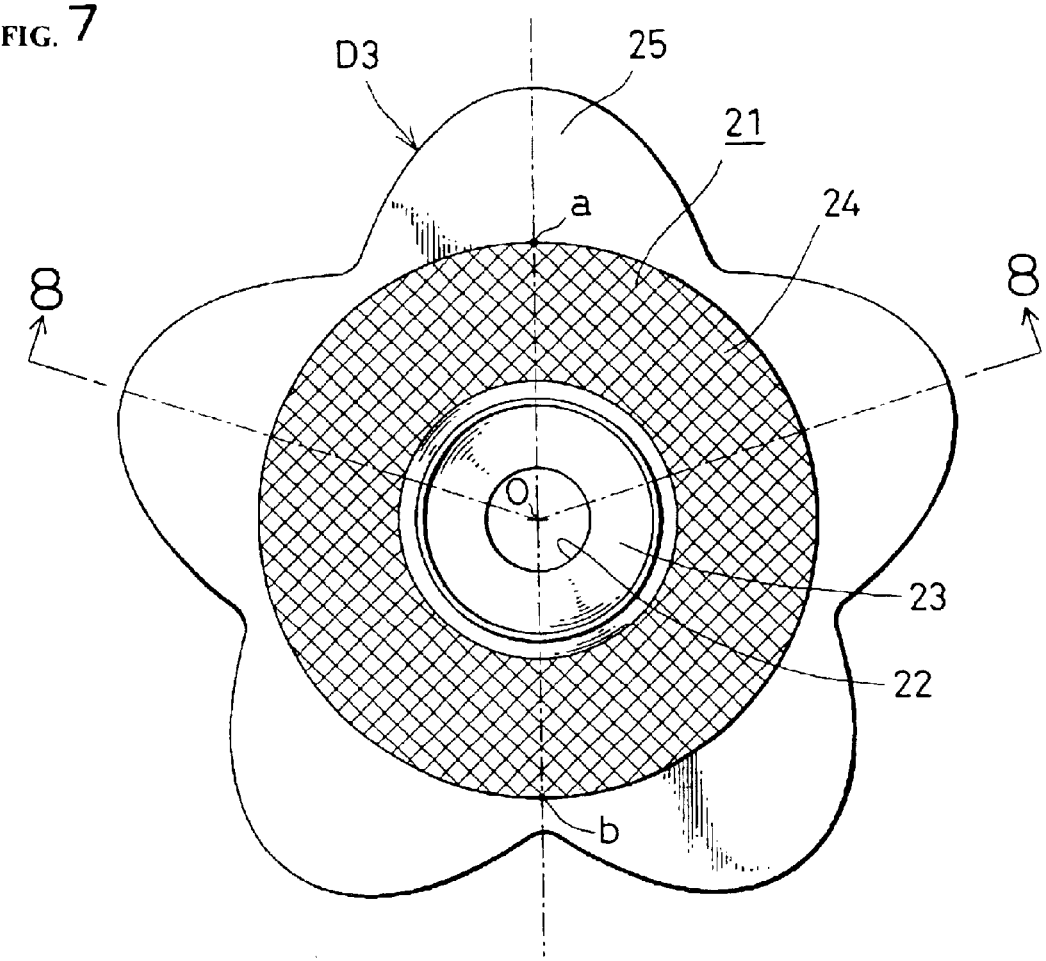
FIG. 7 is a bottom view showing the third embodiment of the optical disc according to the present invention.

FIG. 7 shows the third embodiment of the optical disc according to the present invention. A 1.2 mm thick disc main body 21 is formed into an 8 cm-diameter true circular shape, and 0.9 mm thick outwardly protruded plate portion 25 is formed into an Ume blossom shape surrounding the disc main body 21 in plain.

The optical disc D3 of this embodiment has a disc main body of an 8 cm-diameter true circular shape, and therefore a record information area having the same area as that of the 8 cm-standard-sized optical disc can be secured.

Figure 8:
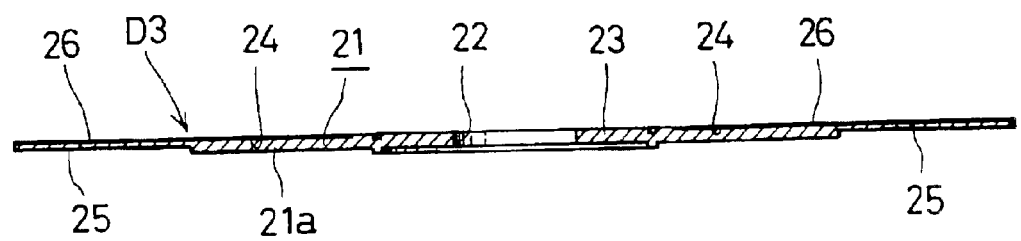
FIG. 8 is an enlarged cross-sectional view showing the reversed optical disc shown in FIG. 7 taken along the line 8—8 in FIG. 7.

In FIGS. 7 and 8, the reference numeral "22" denotes a central aperture, "23" denotes a clamping area, and "24" denotes an information recording area.

In each of the optical discs D1, D2 and D3 of the aforementioned embodiments, the outer peripheral edge of the lower portion of the optical disc main portion is formed into an arc-shape having a considerable length or a true circular shape. Accordingly, the outer peripheral edge of the lower portion of this disc main body is disposed at the vicinity of the inner peripheral edge of the disc main body fitting dented portion when the lower portion of the disc main body is disposed in the disc main body fitting dented portion, and has at least two positioning points capable of positioning the disc main body in the disc main body fitting dented portion.

Figure 9:
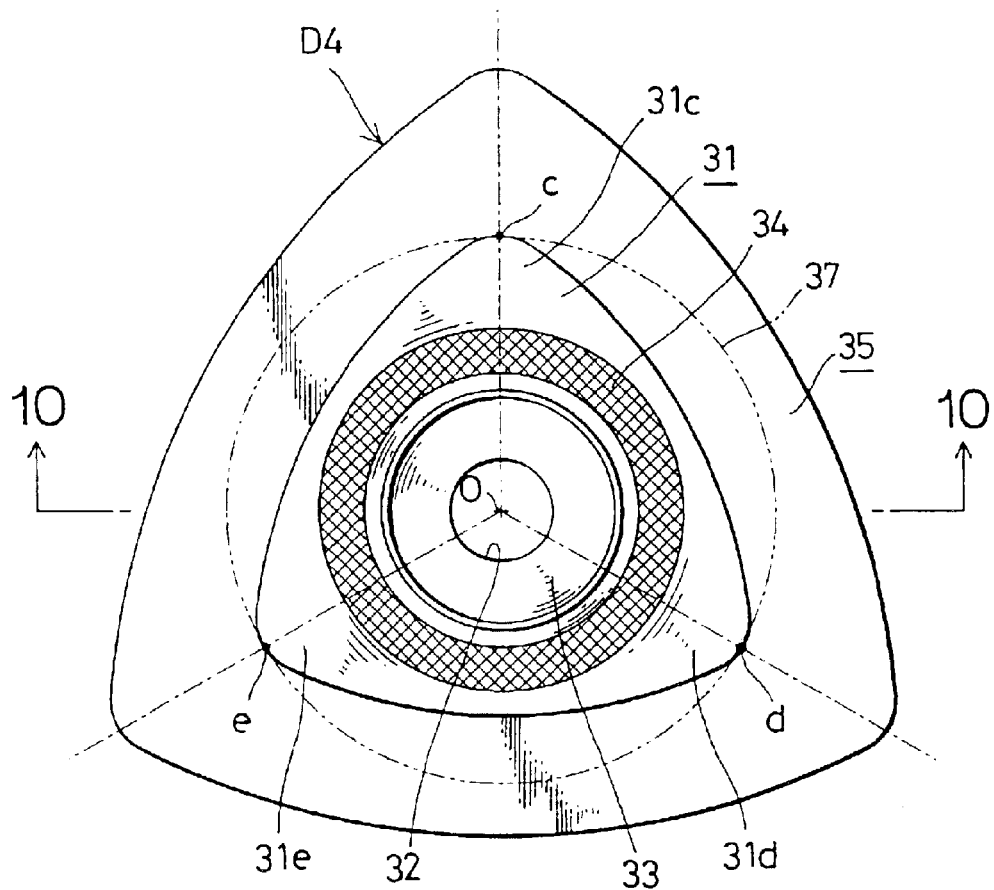
FIG. 9 is a bottom view showing the fourth embodiment of the optical disc according to the present invention.

FIG. 9 shows the fourth embodiment of the optical disc D4 according to the present invention.

This optical disc D4 has a 1.2 mm thick lower portion of a disc main body 31 formed into an axial symmetry triangular shape having three extending portion 31*c*, 31*d* and 31*e* outwardly extending from the ring-shaped information recording area toward the 8 cm-diameter hypothetical true circle perimeter 37 to be located near the inner periphery of the 8 cm diameter disc main body fitting dented portion 92. Each of the extending portions 31*c*, 31*d* and 31*e* has a contact point c, d or e contacting with the hypothetical true circle perimeter 37 at its tip portion. These extending portions 31*c* 31*d* and 31*e* are, in the state where the lower portion of the disc main body 31 is fitted in the disc main body fitting dented portion 92, disposed near the inner periphery of the dented portion 92 to thereby position the disc main body 31 within the dented portion 92. Thus, the disk main body 31 has three positioning points.

Furthermore, the sum of the interior angle ∠cod made by the line segments "co" and "do" connecting the center "o" of the hypothetical true circle and two adjoining contact points "c" and "d," the interior angle ∠doe made by the line segments "do" and "eo" connecting the center "o" of the hypothetical true circle and two adjoining contact points "d" and "e," and the interior angle ∠eoc made by the line segments "eo" and "co" connecting the center "o" of the hypothetical true circle and two adjoining contact points "e" and "c" become 360 degrees. Since the interior angles ∠cod, ∠doe and ∠eoc correspond to the interior angle of the triangle cdo having apexes "c," "d" and "o," the interior angle of the triangle deo having apexes "d," "e" and "o" and the interior angle of the triangle eco having apexes "e," "c" and "o," respectively, these angles are referred to as interior angles.

At the outside of this disc main body 31, a 0.5 mm thick outwardly protruded plate portion 35 as an ornament plate portion analogous to the disc main body 31 is formed into a triangular shape surrounding the disc main body 31. Since this outwardly protruded plate portion 35 is formed to have the size and shape mentioned above, the entire weight thereof becomes slightly larger rather than the weight of the 8 cm-standard-sized optical disc. Therefore, this optical disc never cause overload to a driving motor for a disc player 90. Furthermore, since the thickness of the outwardly protruded plate portion 35 is set to 0.5 mm, the 0.7 mm thick lower portion 1b of the disc main body to be fitted in the disc main body fitting dented portion can be obtained. Therefore, the optical disc D3 can be disposed in the dented portion 92 stably, and hardly drops out of the dented portion 92 even at the time of the retraction movement of the tray 91 of the disc player 90.

Figure 10:
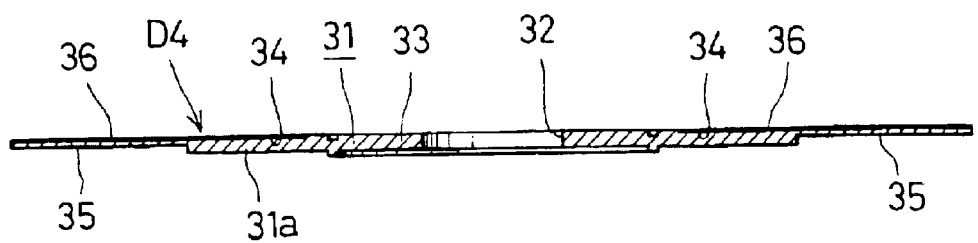
FIG. 10 is an enlarged cross-sectional view showing the reversed optical disc shown in FIG. 9 taken along the line 10—10 in FIG. 9.
Figure 16:
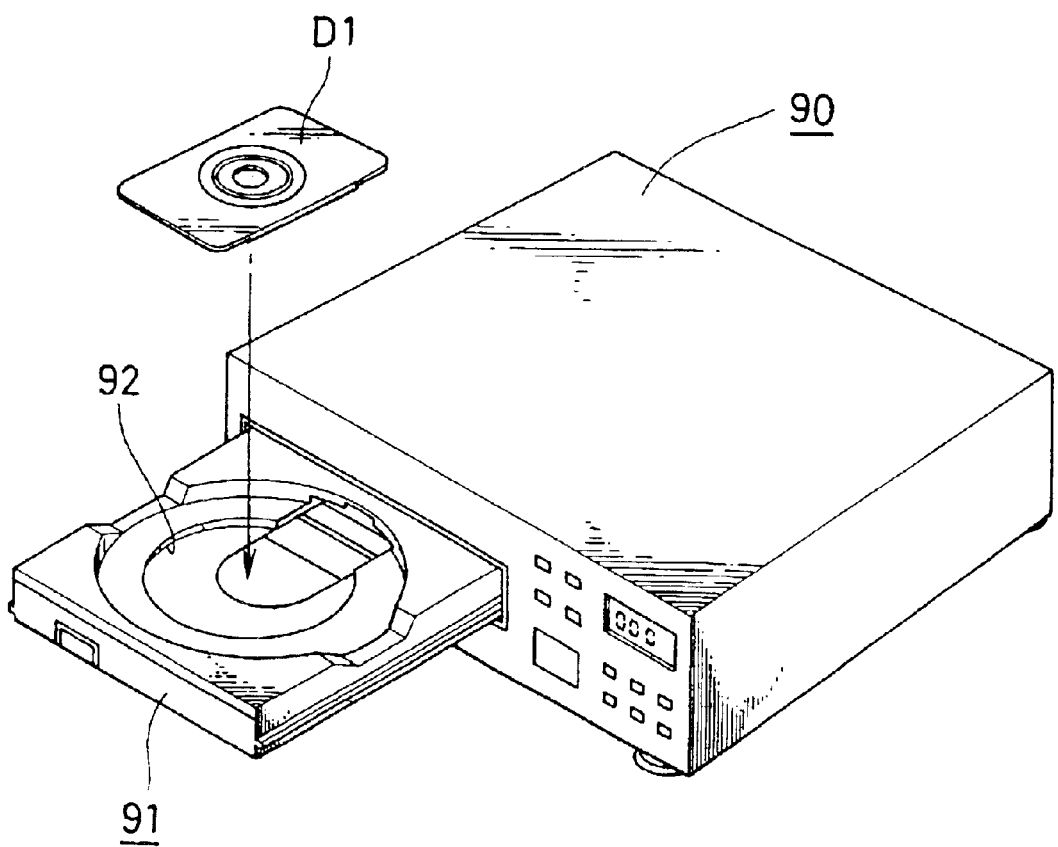
FIG. 16 is a perspective view showing a tray type disc player.

In FIGS. 9 and 10, the reference numeral "32" denotes a central aperture, "33" denotes a clamping area.

Although the optical disc D4 of this embodiment is not provided with any weight increasing protrusion, such weight increasing protrusion may be provided if the area of the outwardly protruded plate portion 35, i.e., the weight, is decreased by changing the configuration thereof.

As mentioned above, according to the present invention, nonstandard-sized optical discs D1, D2, D3 and D4 with no excessive thickness can be obtained. Furthermore, the contour configuration of the outwardly protruded plate portion 5, 15, 25 or 35, which is also functioned as an ornamental plate, can be arbitrarily designed, which enables to obtain a unique optical disc.

Furthermore, in cases where the positioning points are located at two intersections of a straight line passing through a center of the disc main body fitting dented portion and the outer peripheral edge of the lower portion of the disc main body or vicinities thereof, or in cases where the positioning points are three points or more to be disposed in the vicinity of the inner peripheral edge of the disc main body fitting dented portion and the three points or more are positioned so that a total of center side interior angles of triangles formed by segments connecting a center of the disc main body fitting dented portion and two adjacent positioning points become 360 degrees, the disc main body of the optical disc can be fitted in the disc main body fitting dented portion 92 to thereby accurately position the relative positional relationship between the disc main body and the optical pick-up apparatus of the disc player 90.

Furthermore, in cases where the thickness of the outwardly protruded plate portion 5, 15, 25, 35 is 0.4 mm to 1.0 mm, the thickness of the lower portion 1b, 11b, 21b, 31b of the disc main body can be 0.2 mm to 0.8 mm. Accordingly, an optical disc to be fitted in the disc main body fitting dented portion 92 of the tray 91 of the disc player 90 can be provided. Accordingly, an optical disc which never drops out of the disc main body fitting dented portion 92 of the tray 91 even if the disc player 90 is disposed vertically can be obtained.

Furthermore, in cases where the contour configuration of the entire optical disc is formed into a non-circular shape, especially an approximate rectangle shape of 80 to 90 mm long and 50 to 60 mm wide, a name-card-shaped or credit-card-shaped optical disc D1, D2 which can be stored in a wallet or a ticket holding case with no trouble can be obtained.

Furthermore, in cases where the disc main body has at its lower portion a downwardly protruded weight increasing protrusion, even if the optical disc is relatively small in size, the optical disc can prevent or decrease overload to a driving motor of a disc player as an optical disc D2 having a weight equal to or similar to the weight of an 8 cm-standard-sized optical disc.

Furthermore, in cases where the thickness of the weight increasing protruded portion 18 is 0.3 mm or less, the entire thickness of the disc main body can be limited to 1.5 mm or less, resulting in an optical disc applicable to a slot-in type disc player.

INDUSTRIAL APPLICABILITY

The optical disc according to the present invention can be used as CDs, DVDs, etc. In cases where the outer peripheral configuration thereof is a non-circular shape, a unique optical disc can be obtained. Furthermore, the optical disc can be applied to a player and can be stored in a non-bulky state like a standard-sized optical disc.

What is claimed is:

1. An optical disc, comprising:
a disc main body including a clamping area and an information recording area outside said clamping area; and
an outwardly protruded plate portion which outwardly protrudes outside said disc main body with an upper surface of said plate portion flush with an upper surface of said disc main body,
wherein said outwardly protruded plate portion has a thickness smaller than that of said disc main body,
wherein said disc main body is formed to have a thickness of 1.2 mm, and a lower portion of said disc main body is formed to have a size to be fitted in an 8 cm-diameter standard-sized main body fitting dented portion formed in a tray of a disc player, and said lower portion of said disc main body has a first weight increasing protrusion which protrudes downwardly at said lower surface thereof and an area other than said information recording area, and said first weight increasing protrusion has an outer peripheral edge which coincides with an outer peripheral edge of said lower portion of said disc main body, and
wherein said outer peripheral edge of said lower portion of said disc main body has at least two positioning points to be disposed in the proximity of an inner peripheral edge of said disc main body fitting dented portion to thereby position said disc main body in said disc main body fitting dented portion when said lower portion of said disc main body is fitted in said disc main body fitting dented portion.

2. The optical disc as recited in claim 1, wherein said positioning points are located at two intersections of a straight line passing through a center of said disc main body fitting dented portion and said outer peripheral edge of said lower portion of said disc main body or vicinities thereof.

3. The optical disc as recited in claim 2, wherein a contour configuration of an entire optical disc including said outwardly protruded plate portion is formed into a non-circular shape.

4. The optical disc as recited in claim 2, wherein a thickness of said outwardly protruded plate portion is 0.4 to 1.0 mm.

5. The optical disc as recited in claim 2, wherein said lower portion of said disc main body has a second weight increasing protrusion which protrudes downwardly at a lower surface thereof between a central aperture of said optical disc main body and said information recording area.

6. The optical disc as recited in claim 2, wherein a thickness of said first weight increasing protrusion is 0.3 mm or less.

7. The optical disc as recited in claim 2, wherein a thickness of said second weight increasing protrusion is 0.3 mm or less.

8. The optical disc as recited in claim 1, wherein said positioning points are three points or more to be disposed in the vicinity of said inner peripheral edge of said disc main body fitting dented portion, and wherein said three points or more are positioned so that a total of center side interior angles of triangles formed by segments connecting a center of said disc main body fitting dented portion and two adjacent positioning points become 360 degrees.

9. The optical disc as recited in claim 8, wherein a contour configuration of an entire optical disc including said outwardly protruded plate portion is formed into a non-circular shape.

10. The optical disc as recited in claim 8, wherein a thickness of said outwardly protruded plate portion is 0.4 to 1.0 mm.

11. The optical disc as recited in claim 8, wherein said lower portion of said disc main body has a second weight increasing protrusion which protrudes downwardly at a lower surface thereof between a central aperture of said optical disc main body and said information recording area.

12. The optical disc as recited in claim 2, wherein a thickness of said first weight increasing protrusion is 0.3 mm or less.

13. The optical disc as recited in claim 8, wherein a thickness of said second weight increasing protrusion is 0.3 mm or less.

14. The optical disc as recited in claim 1, wherein a contour configuration of an entire optical disc including said outwardly protruded plate portion is formed into a non-circular shape.

15. The optical disc as recited in claim 14, wherein said contour configuration is formed into an approximate rectangle shape of 80 to 90 mm long and 50 to 60 mm wide.

16. The optical disc as recited in claim 1, wherein a thickness of said outwardly protruded plate portion is 0.4 to 1.0 mm.

17. The optical disc as recited in claim 1, wherein said lower portion of said disc main body has a second weight increasing protrusion which protrudes downwardly at a lower surface thereof between a central aperture of said optical disc main body and said information recording area.

18. The optical disc as recited in claim 1, wherein a thickness of said first weight increasing protrusion is 0.3 mm or less.

19. The optical disc as recited in claim 1, wherein a thickness of said second weight increasing protrusion is 0.3 mm or less.

* * * * *